United States Patent [19]
Leong

[11] Patent Number: 5,303,403
[45] Date of Patent: Apr. 12, 1994

[54] ELECTRONIC SWITCH FOR SELECTING SATELLITE POLARIZATION SIGNALS

[75] Inventor: Ioc-Heng Leong, Hsinchu, Taiwan

[73] Assignee: Microelectronics Technology, Inc., Hsinchu, Taiwan

[21] Appl. No.: 899,338

[22] Filed: Jun. 16, 1992

[51] Int. Cl.$^5$ ............................................. H04B 1/16
[52] U.S. Cl. ................... 455/192.3; 455/3.2; 307/234; 307/271
[58] Field of Search ............... 307/234, 271; 455/3.2, 455/4.1, 6.3, 192.3; 358/86

[56] References Cited

U.S. PATENT DOCUMENTS

| | | | |
|---|---|---|---|
| 4,027,301 | 5/1977 | Mayer | 340/183 |
| 4,127,818 | 11/1978 | Mogi | 455/192.3 |
| 4,290,055 | 9/1981 | Furney et al. | 340/518 |
| 4,429,415 | 1/1984 | Chin et al. | 455/192.3 |
| 4,608,710 | 8/1986 | Sugiura | 455/3.2 |
| 4,672,687 | 6/1987 | Horton et al. | 455/3.2 |
| 4,736,458 | 4/1988 | Lommers | 455/192.3 |
| 4,941,050 | 7/1990 | Bird | 455/164.1 |

Primary Examiner—John S. Heyman
Assistant Examiner—My-Trang Ton
Attorney, Agent, or Firm—Merchant, Gould, Smith, Edell, Welter & Schmidt

[57] ABSTRACT

An electronic switch used in a low-noise block down converter for receiving satellite horizontal or vertical polarization signals. The electronic switch only needs one single wire to receive a pulse width signal of a TV receiver. The electronic switch output a HIGH voltage level and a LOW voltage level according to the pulse Width of the signal from the TV receiver to control the selection of the vertical or horizontal polarization signals.

3 Claims, 5 Drawing Sheets

ELECTRONIC SWITCH FOR SELECTING SATELLITE POLARIZATION SIGNALS

BACKGROUND OF THE INVENTION

The present invention relates to an electronic switch used in a low noise block down converter for selecting satellite vertical or horizontal polarization signals. The electronic switch utilizes an electronic pulse technique to obtain advantages of high reliability and optimal effects.

The present satellite television receiving system commonly uses a mechanical switch to select the horizontal and vertical polarization signals. In the example of the North-American satellite television system (as shown in FIG. 5), the feed horn 41 of the low noise down converter (LNB) comprises a servo motor 42 which is activated by signals of ground, +5 V and a pulse Width supplied by a TV receiver 43. One end of the servo motor 42 is connected to a probe 44 so that when the servo motor 42 is rotating, the probe 44 can be forced to rotate to receive the vertical or horizontal polarization signal. However, such a mechanical switch has disadvantages as follows: (1) the reliability of the servo motor is low, particularly in winter, the water flowing into the motor (if any) will be condensed such that the motor is possibly hard to be rotated; and (2) the servo motor is a separately located means, therefore, there are needed three cables to receive the ground, 5 V and pulse width signals from the receiver 43, so that the cost of the system will be higher and the construction thereof will be more complicated.

SUMMARY OF THE INVENTION

To solve the problems of low reliability and high cost of the prior art, one object of the present invention is to provide an electronic switch which omits the servo motor and is composed of a number of electronic elements so that when controlled by the signals from the TV receiver, the electronic elements can be switched to "ON" or "OFF" state to select appropriate polarization signals.

A further object of the present invention is to provide an electronic switch which is combined with a low noise block down converter of a satellite receiving system and both of them are packaged in a same housing, the control signals +5 V and G (ground) from the TV receiver can be obtained from the converter itself and the housing respectively so that there is only needed one single controlled line for connecting the TV receiver and the switch. Therefore, the cost of the present invention can be reduced and the installation thereof is simpler.

These and other objects, advantages and features of the present invention will be apparent from the following description of the preferred embodiment taken in connection with the accompanying drawings wherein:

BRIEF DESCRIPTION OF THE DRAWINGS

FIGS. 4(a), 4(b), 4 (c) and 4(d) show waveform diagrams on points (a), (b), (c) and (d) of FIG. 3, respectively.

DETAILED DESCRIPTION OF THE INVENTION

Figure 1:
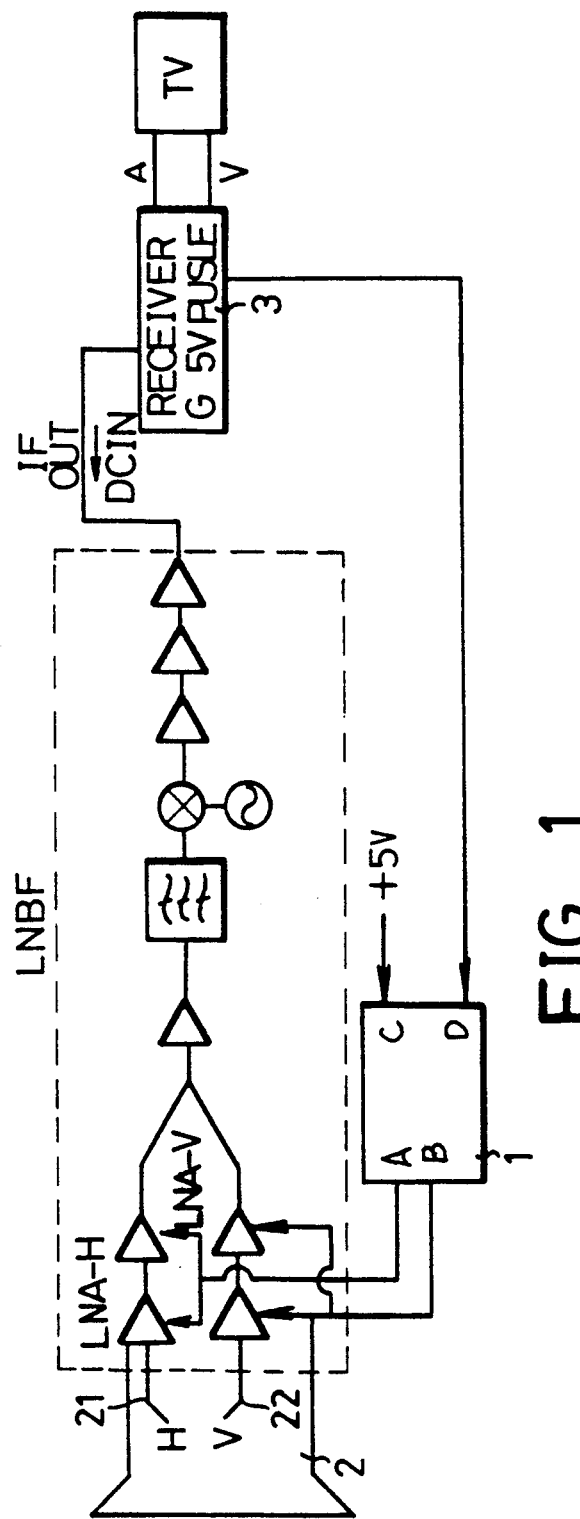
FIG. 1 shows a circuit diagram of an electronic switch of the present invention together with a dual-port low noise down converter (LNBF)

Referring to FIG. 1 it can be seen that the electronic switch in accordance with the present invention is connected with a dual-port low noise block down converter (LNBF) and both of them are installed in a same housing (not shown). The electronic switch 1 has two output terminals A and B connected to a horizontal and a vertical amplifiers LNA-H and LNA-V of the low noise down block converter LNBF respectively to control the receipts of the polarization signals of a horizontal and a vertical probes 21 and 22 which are installed in a feedhorn 2 on the front of the converter. The switch 1 further comprises an input terminals D to receive a pulse signal from a TV receiver 3.

In the prior art, the selection switch is controlled by three wires of a ground (G), a +5 V and a pulse from a TV receiver 3. However, in accordance with the present invention, the low noise block down converter itself has a regulator (not shown) which can provide a +5 V stable voltage (from the terminal C shown in FIG. 1). The housing of the low noise block down converter (LNBF) and the chassis of the receiver (not shown) are common ground which are connected to a ground through an outer conductor of a coaxial cable 8. In the present invention, the +5 V and the ground used for the switch 1 are obtained from the low noise block down converter itself and there is only needed a wire for the switch 1 to receive the pulse signal from the TV receiver 3, as shown in the figure.

Figure 2:
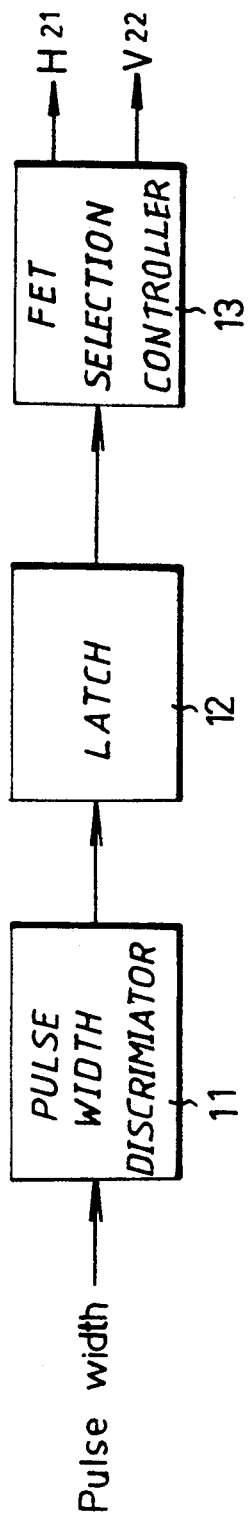
FIG. 2 shows a block diagram of the electronic switch of the present invention.

FIG. 2 shows a block diagram of the switch 1 in accordance with the present invention. The switch 1 mainly comprises a pulse width discriminator 11, a latch 12 and a FET selection controller 13. The pulse width signal from the TV receiver 3 are first sent to the pulse width discriminator 11 which discriminates the pulse width of the signal. If the pulse width of the signal is higher than a first pre-determined pulse width (e.g., 2 ms), the discriminator 11 will output a pulse signal with a predetermined frequency to the latch 12 and if the pulse width is lower than a second pre-determined pulse width (e.g., 1.5 ms), the discriminator 11 outputs a 0 V to the latch 12. In the former situation, the latch 12 will latch the pulse signal input from the discriminator 11 and outputs a 5 V voltage. In the latter situation, the latch 12 outputs a 0 V voltage. Both of the 5 V and the 0 V are sent to the FET selection controller 13. The FET selection controller 13 comprises two switching FET circuits connected with the horizontal and vertical probes 21 and 22 respectively and are controlled to be turned on or turned off by the output signal from the latch 12, whereby selecting the horizontal or vertical polarization signal.

Figure 4A:
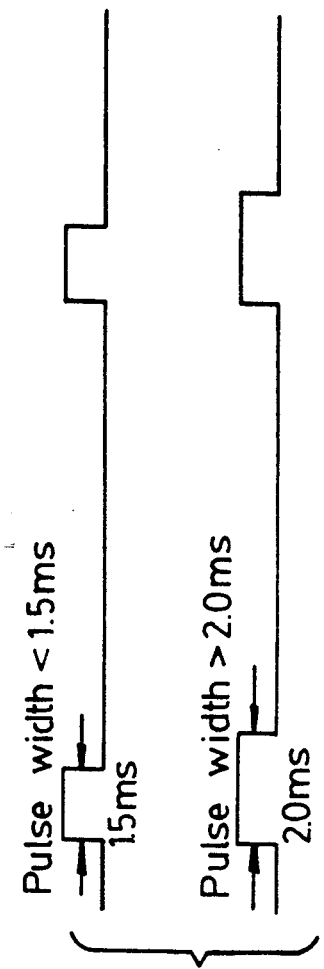
Figure 3:
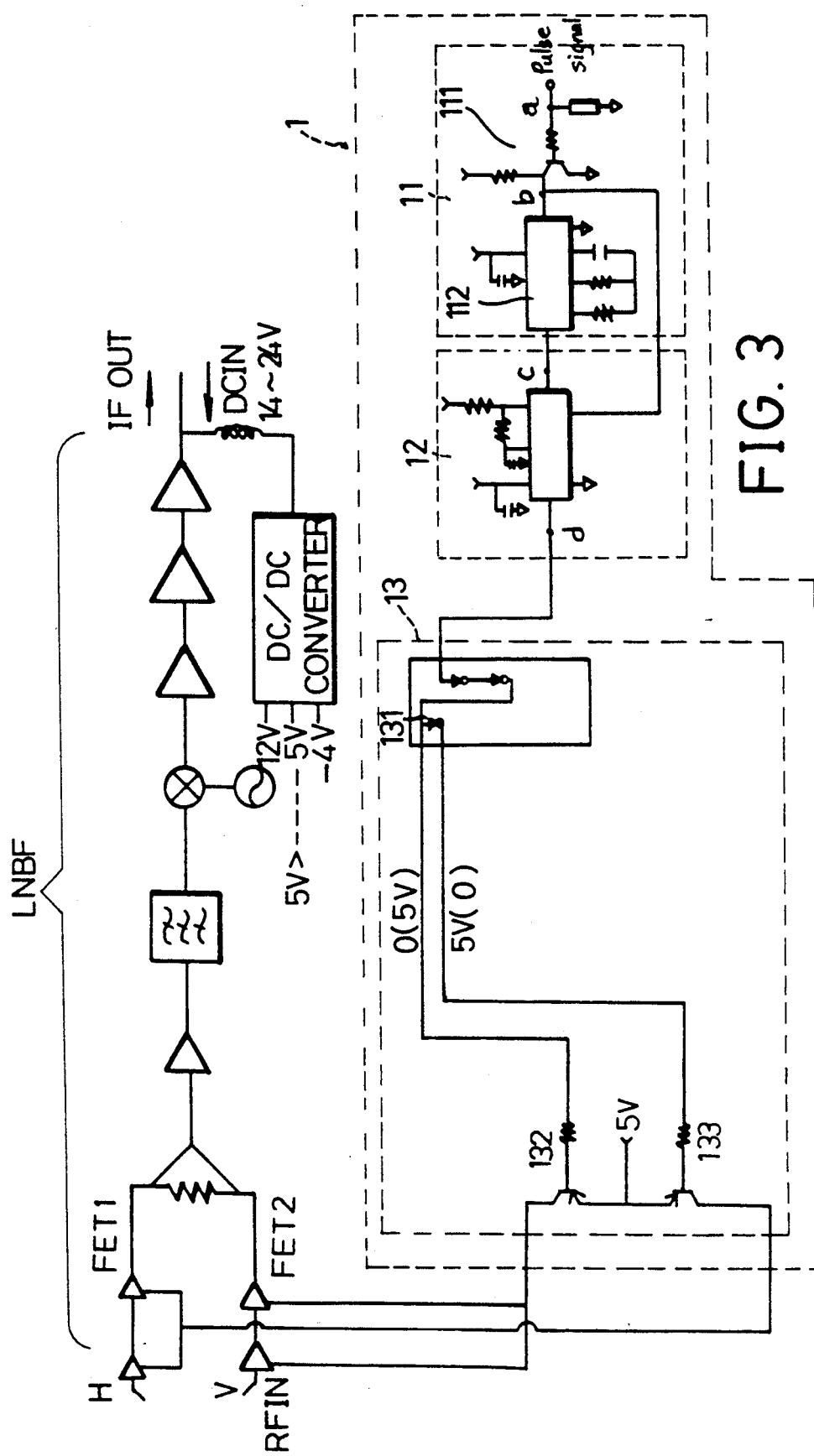
FIG. 3 shows a detailed circuit diagram of the circuit shown in FIG. 1.
Figure 4:
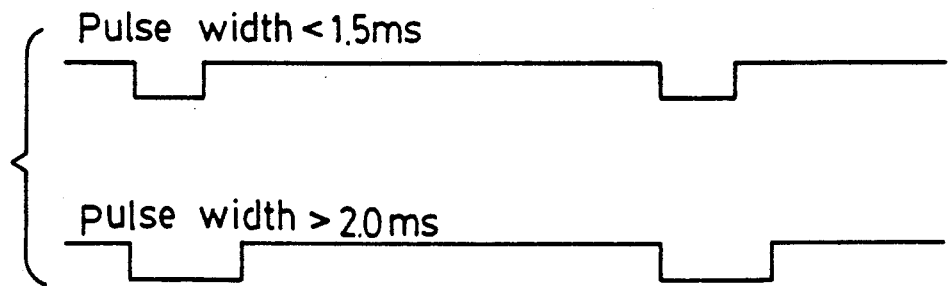
Figure 4:
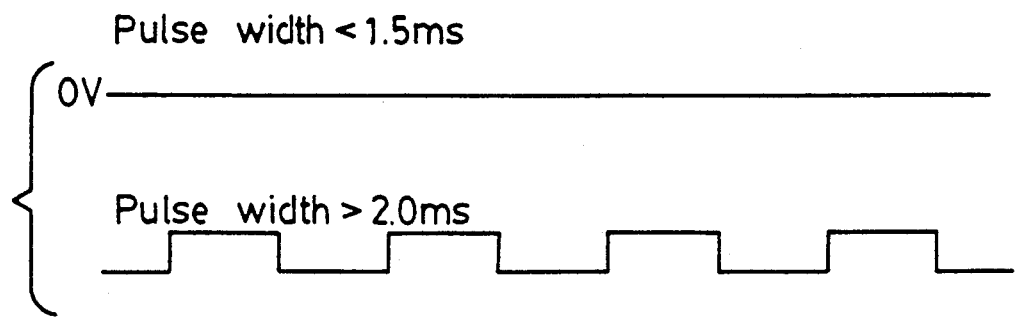
Figure 4:
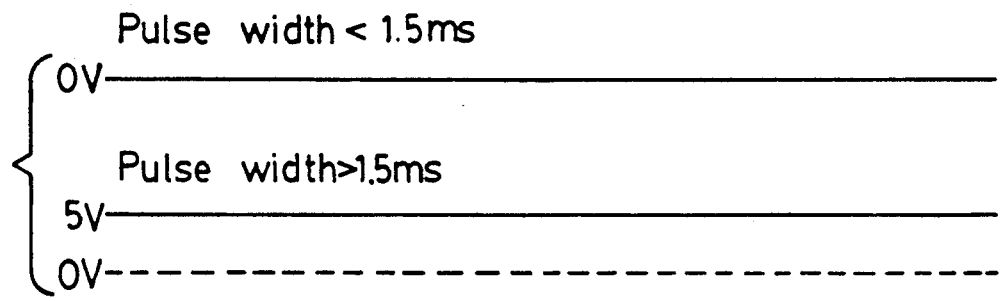
Figure 5:
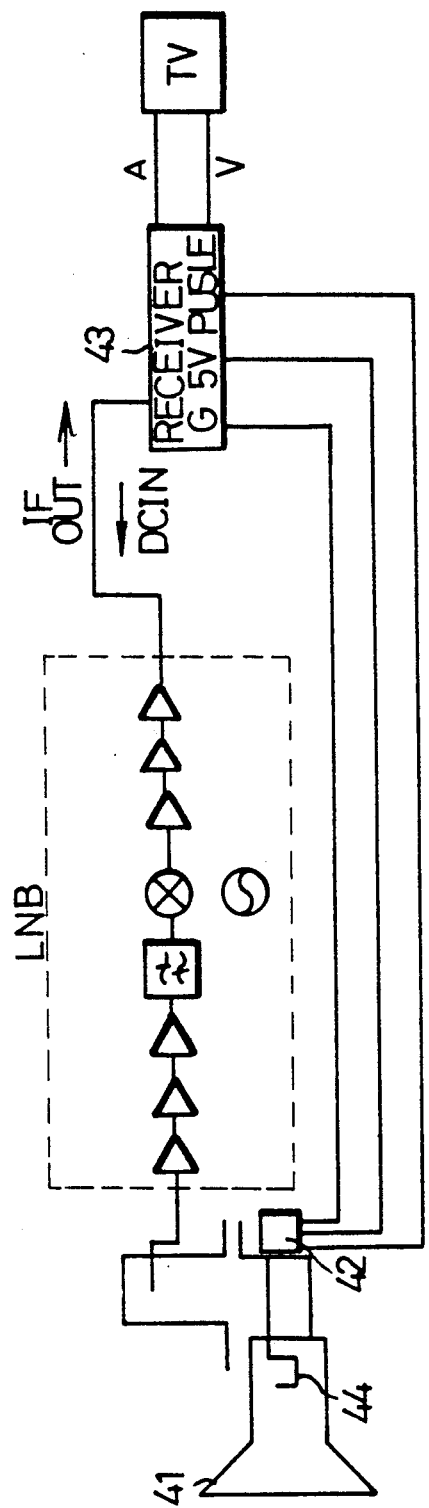
FIG. 5 shows a circuit diagram of the conventional mechanical switch together with a satellite low noise block down converter.

Now please refer to FIG. 3 which represents a more detailed circuitry of the switch 1 together with the low noise block down converter LNBF. In the figure, the TV receiver 3 in FIG. 1 is not shown but a pulse signal from the TV receiver is represented. To describe the operation manner of the switch 1, FIGS. 4(a)-4(d) shows waveform diagrams on points (a) to (d) in FIG. 1, respectively, for references. From the figures, it can be seen that the pulse width discriminator 11 comprises an inverter portion 111 and a pulse width discriminating portion 112. The pulse signals from the TV receiver as shown in FIG. 4(a) are divided into two groups of pulses: one is a group of pulses with a pulse width lower than 1.5 ms and the other is a group of pulse with a pulse width higher than 2.0 ms. The pulse signals are first inverted by the inverter portion 111 (as shown in FIG. 4(b)). Then, the discriminating portion 112 discriminates the inverted pulse signals to send a 0 V for the pulse signals with the width lower than 1.5 ms and a 5 V pulse having a pre-determined frequency for the pulse signals with the width higher than 2.0 ms (as shown in FIG. 4 (c)) to the latch 12. Thereafter, the latch 12 outputs a 5 V signal for the 5 V pulse and a 0 V signal for the 0 V pulse (as shown in FIG. 4(d)) to the FET selection controller 13.

The FET selection controller 13 mainly comprises two switching FET circuits 132 and 133 for controlling the reception of the horizontal or the vertical polarization signals. The FET selection controller 13 further comprises a complementary element 131 which has an input terminal connected with the latch 12 and two output terminals connected to the switching FET cicuits respectively to output two complementary values. The outputs of the complementary element 131 should be 0 V and 5 V or 5 V and 0 V which are dependent on the input signal of the input terminal. Since the outputs of the complementary element 131 are one in high voltage (5 V) and the other in low voltage (0 V), only one of the switching FET circuits 132 and 133 will be turned on such that only one polarization signal (horizontal or vertical) can be selected.

In view of the above, it can be seen that the +5 V and ground used to control the electronic switch 1 of the present invention can be obtained from a regulator installed in the low noise block down converter and a common ground through the outer conductor of the coaxial cable 8. Therefore, there is only needed a single wire to receive the pulse width signal of the TV receiver which makes the installation of the switch simpler. Further, the transformation of the signals will be better than the conventional mechanical switch.

The embodiments described above are for the purpose of illustration rather than limitation. It is understood that many modifications and variations of the present invention are possible in light of the above teachings. It is therefore to be understood that the invention may be practiced otherwise than as specially described herein and yet remains within the scope of the appended claims.

I claim:

1. An electronic switch used in a low noise block down converter (LNB) for controlling the reception of satellite polarization signals, said electronic switch comprising:
   a pulse width discriminator for comparing widths of an input signal with a reference width to output a pulse with a pre-determined frequency and a 0 V signal according to the comparison results, respectively;
   a latching means for receiving said pulse with a pre-determined frequency and said 0 V signal from said width discriminator to output a high voltage and a low voltage to a FET selection controller, respectively; and
   said FET selection controller comprising two switching FET circuits respectively connected with a horizontal probe and a vertical probe and a complementary element; said complementary element receiving the outputs of said latching means and outputting two complementary signals to said two switching FET circuits so that only one of said FET circuits is turned on at a time, whereby selecting a desired polarization signal.

2. The electronic switch according to claim 1, wherein the pulse width discriminator outputs the pulse with a pre-determined frequency if the pulse width of the input signal is higher than the reference width and outputs the 0 V signal if the pulse width of the input signal is lower than the reference width.

3. The electronic switch according to claim 1, wherein the input signal of said pulse width discriminator is coming from a TV receiver.

* * * * *